United States Patent Office 3,253,884
Patented May 31, 1966

3,253,884
STABILIZED HYDROGEN SOURCE AND
METHOD THEREFOR
Margarete Jung, Niedereschbach, Taunus, Germany, and
Hanns H. Kroeger, Schenectady, N.Y., assignors to
Varta Aktiengesellschaft, Hagen, Westphalia, Germany,
a corporation of Germany
No Drawing. Filed July 5, 1962, Ser. No. 207,777
Claims priority, application Germany, July 6, 1961,
A 37,813
13 Claims. (Cl. 23—14)

The present invention relates to the production of gaseous hydrogen. More particularly, it is concerned with a new composition of matter which may be stored indefinitely and is adapted to serve as a metered source of supply of hydrogen, as well as with a method of releasing hydrogen in controlled amounts. The composition of matter of this invention may be stored without particular precautions or safety measures.

A variety of sources of gaseous hydrogen have been proposed and their selection depends partly on the required amount of hydrogen gas, partly on the requirements of the apparatus wherein the gas is used, and primarily on the desired purity of the gas.

Pure hydrogen gas may be obtained by the decomposition of hydrides by water or acids. It has been proposed, for instance, to use tablets of a composition comprising sodium boron hydride and a normally solid acid, and to place such tablets into water to evolve hydrogen. The major disadvantage of such a hydrogen source is the fact that these tablets can be stored only if precautionary measures are taken to protect them from atmospheric air since even air with a normal degree of humidity will cause a strong decomposition which may increase to the point of explosive force. The reason for this is the strong hygroscopicity of sodium boron hydride, which attracts the water from the atmosphere and thus spontaneously dissociates and causes hydrogen to evolve. This happens also when sodium boron hydride powder is poured into water. The pH of an aqueous sodium boron hydride solution is about 7.9 or so low that the hydride is dissociated and hydrogen evolves.

In accordance with the present invention, this advantage is overcome and a controlled source of pure hydrogen is formed by a mixture of potassium boron hydride (KBH$_4$) and at least the equivalent amount of a solid, non-hygroscopic substance which is at least slightly soluble in water and lowers the pH of an aqueous solution of the hydride.

Potassium boron hydride does not adsorb atmospheric moisture. When it is placed into water, it dissolves rather quickly without evolving hydrogen, the pH of the aqueous solution being about 8.3. This higher pH-value is probably responsible for the greater stability of the potassium boron hydride. When the alkalinity of its aqueous solution is lowered by the addition of a substance which turns it acidic, dissociation of the hydride and evolution of hydrogen is obtained. Complete dissociation is obtained when an amount equivalent to the amount of potassium ions of a substance, for instance, an acid is added to the hydride, which substance is capable of forming a salt with the potassium ions and, with the aid of the hydrogen ions, converts the hydroxyl ions into water. The pH-value of the resultant solution is at least as low as that of an aqueous sodium boron hydride solution and, preferably, is somewhat lower.

The equivalence ratio between the potassium boron hydride component and the at least slightly water-soluble acidic or buffering substance in the mixture may vary between about 1:1 and about 1:5, preferably between 1:1.5 and 1:2.5. For instance, at least one mole of a monobasic, ½ mole of a dibasic, and ⅓ mole of a tribasic acid must be used per mole of the hydride. More than five equivalents will not be used for economic reasons.

If an excess of the acidic or buffering substance beyond the equivalent amount is used, it will be dissolved in the aqueous solution faster than the hydride. This, of course, influences the speed of the hydrogen evolution so that the same may be controlled by the excess of the substance added to the hydride. Similar control is possible by selecting the speed of solution of an equivalent amount of the substance, for instance, by selecting substances of different degrees of water solubility or of different grain sizes, or by agitating the solution, or elevating its temperautre.

The speed of solution is more important than the degree of solubility because, after solution, such substances are present only in the form of the potassium salts, all of which are much more readily soluble than the added substances.

The most useful form of the mixture is in the shape of a tablet. A mixture of a predermined composition and weight may thus be pressed into a tablet and a predetermined number of such tablets may be dropped into water to produce a controlled source of hydrogen gas delivering a metered amount of the gas as the composition decomposes in the water.

Experience has shown that the decomposition of the mixture will produce the full theoretical yield of hydrogen. Thus, four moles of hydrogen will evolve per mole of potassium boron hydride.

It will be obvious to the skilled in the art that a great many organic and inorganic acidic or buffering substances may be used, the only essential properties being that the substance be substantially inert to potassium boron hydride in the absence of water, solid under normal temperature and pressure conditions, non-hygroscopic, and lowers the pH-value of an aqueous potassium boron hydride solution, preferably below 7.0.

Following is a list of some substances found useful in the invention, the substances being listed beginning with the slowest evolution of hydrogen to the fastest hydrogen evolution when used on equivalent amounts with the hydride.

Phthalic acid anhydride and succinic acid anhydride as well as other anhydrides of weak organic acids; ammonium chloride; benzoic acid; salicyclic acid; alkali hydrogen oxalate; sulfamic acid, potassium dihydrogen phosphate, and other non-hydgroscopic acidic salts of polybasic mineral acids; oxalic and tartaric acid and other strong organic acids.

If more than the equivalent amount of any of these substances is used, the dissociation of the potassium boron hydride will be correspondingly increased.

The practice of this invention will be more fully explained in the following examples given merely for purposes of illustration and without in any way limiting the scope thereof.

*Example 1*

54 g. potassum boron hydride and 145.5 g. of sulfamic acid were thoroughly mixed. The mixture was pressed into tablets under a pressure of 0.8 t./sq. cm.

When the tablets were thrown into water, lively hydrogen evolution ensued and the yield was theoretical, i.e., 100% of the hydrogen in the hydride was recovered. After the evolution of hydrogen stopped, the water had a clearly acidic reaction.

The shelf life of the tablets was tested by storing one part of the tablets without protection against the atmosphere while the other part was stored in a desiccator over calcium chloride (CaCl$_2$). After 14 days, tablets from each part were tested in water and no difference was detected between the tablets stored in the air and those stored in the desiccator.

*Example 2*

Potassium boron hydride and ammonium chloride were thoroughly mixed in a molar ratio of 1:2 and shaped into tablets in the manner of Example 1. The same tests involving the shelf life of these tablets and their use as a controlled source of hydrogen gas gave the same results as the tablets of Example 1, as to yield and storability.

*Example 3*

Potassium boron hydride and oxalic acid were thoroughly mixed in equivalent amounts, i.e., a molar ratio of 2:1 and shaped into tablets as in Example 1. The hydrogen yield and the storability of these tablets was again similar to those of Example 1.

*Example 4*

Potassium boron hydride and succinic acid anhydride were thoroughly mixed in an equivalent proportion of 1.0:2.5 and shaped into tablets as in Example 1. When the tablets were thrown into water, hydrogen began evolving at the rate of solution of the anhydride in the water. At the end of the decomposition, the yield was again theoretical, based on the hydrogen in the potassium boron hydride.

In an analogous manner there are prepared mixtures of potassium boron hydride and phthalic acid anhydride, succinic acid anhydride, and other acidic and buffering compounds as they have been mentioned herein above.

We claim:

1. A method for stabilizing potassium boron hydride against spontaneous decomposition and evolution of hydrogen in atmospheric humid air which comprises mixing potassum boron hydride with at least an equivalent amount of a solid, non-hygroscopic acidifying compound selected from the group consisting of organic acids, organic acid anhydrides, acidic ammonium salts, and acidic alkali metal salts of polybasic acids.

2. A method for stabilizing potassum boron hydride against spontaneous decomposition and evolution of hydrogen in atmospheric humid air which comprises mixing potassium boron hydride with at least an equivalent amount of succinic anhydride.

3. The process of claim 1 in which the acidifying compound is sulfamic acid.

4. The process of claim 1 in which the acidifying compound is ammonium chloride.

5. The process of claim 10 in which the acidifying compound is oxalic acid.

6. The process of claim 1 in which the acidifying compound is potassium hydrogen phosphate.

7. An intimate mixture stable against spontaneous decomposition and evolution of hydrogen in atmospheric humid air which comprises potassium boron hydride and at least an equivalent amount of a solid, non-hygroscopic acidifying compound selected from the group consisting of organic acids, organic acid anhydrides, acidic ammonium salts, and acidic alkali metal salts of polybasic acids.

8. The stable mixture of claim 7 pressed into a shaped article.

9. An intimate mixture stable against spontaneous decomposition and evolution of hydrogen in atmospheric humid air which comprises potassium boron hydride and at least an equivalent amount of a solid, non-hygroscopic acidifying compound selected from the group consisting of organic acids, organic acid anhydrides, acidic ammonium salts, and acidic alkali metal salts of polybasic acids and effective to lower the pH of an aqueous solution of the potassium boron hydride to a pH below about 7.0, the equivalence ratio of the acidifying compound to the potassium boron hydride ranging from about 1 to about 1.5.

10. The stable mixture of claim 7 in which the acidifying compound is sulfamic acid.

11. The stable mixture of claim 7 in which the acidifying compound is ammonium chloride.

12. The stable mixture of claim 7 in which the acidifying compound is oxalic acid.

13. The stable mixture of claim 7 in which the acidifying compound is succinic anhydride.

References Cited by the Examiner

UNITED STATES PATENTS 2,534,533  12/1950  Schlesinger et al. _____ 23—14

FOREIGN PATENTS 1,069,588  11/1959  Germany.

BENJAMIN HENKIN, *Primary Examiner.*

MAURICE A. BRINDISI, *Examiner.*

A. J. STEWART, E. STERN, *Assistant Examiners.*